July 23, 1968  R. E. LANGLOIS ET AL  3,393,985
STRAND DELIVERY APPARATUS
Original Filed Oct. 18, 1962  5 Sheets-Sheet 1

INVENTORS
ROLAND E. LANGLOIS &
BY RALPH M. STREAM

ATTORNEYS

July 23, 1968  R. E. LANGLOIS ET AL  3,393,985
STRAND DELIVERY APPARATUS
Original Filed Oct. 18, 1962  5 Sheets-Sheet 3

INVENTORS
ROLAND E. LANGLOIS &
BY RALPH M. STREAM

ATTORNEYS

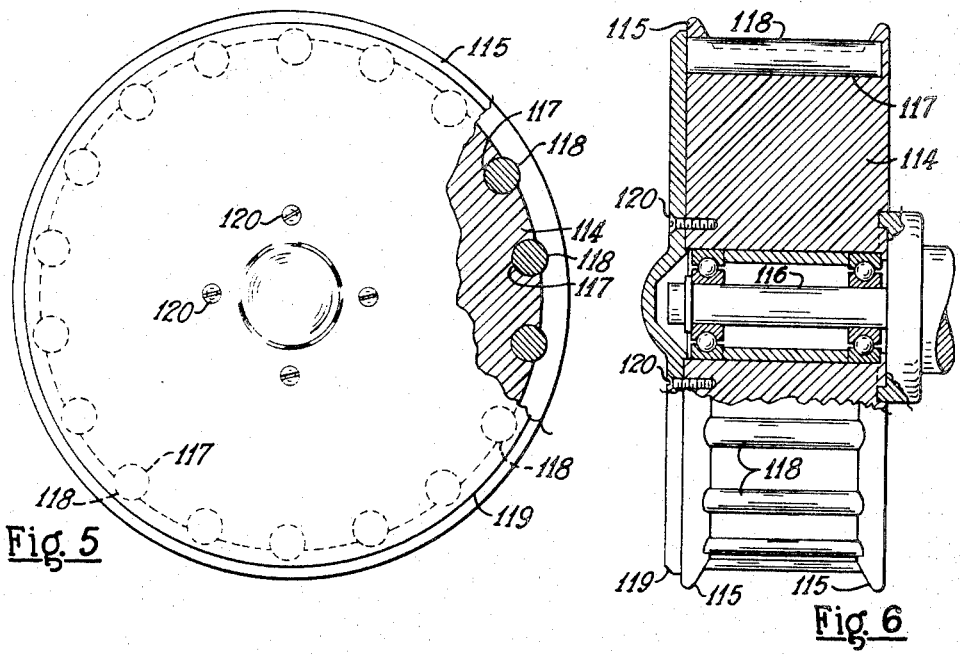

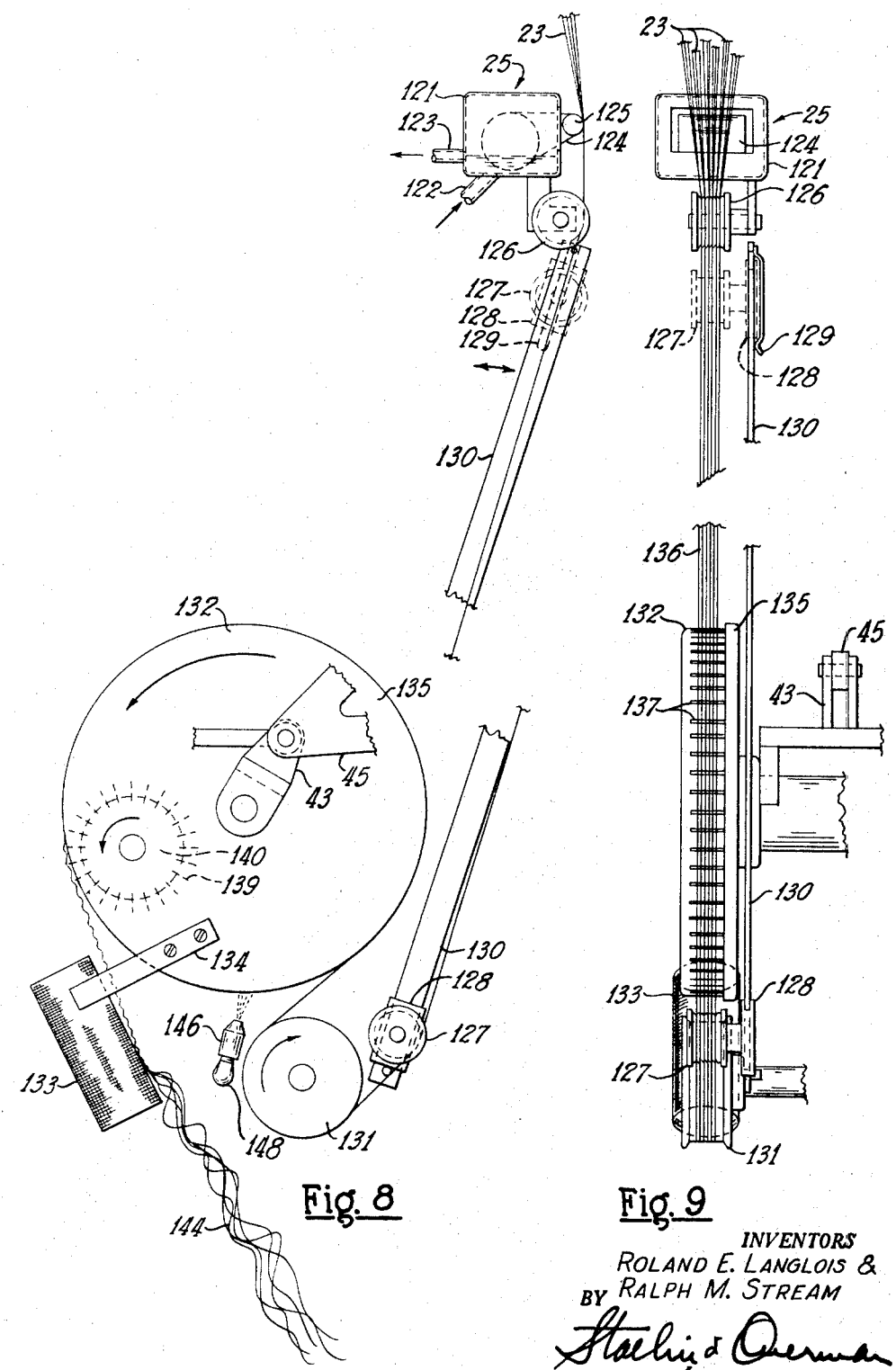

3,393,985
STRAND DELIVERY APPARATUS
Roland E. Langlois and Ralph M. Stream, Newark, Ohio, assignors to Owens-Corning Fiberglas Corporation, a corporation of Delaware
Original application Oct. 18, 1962, Ser. No. 231,432, now Patent No. 3,265,482, dated Aug. 9, 1966. Divided and this application Apr. 12, 1966, Ser. No. 542,011
The portion of the term of the patent subsequent to Aug. 9, 1983, has been disclaimed
7 Claims. (Cl. 65—9)

The subject application is a division of pending application Ser. No. 231,432 carrying the same title, and filed by applicants on Oct. 18, 1962, now Patent No. 3,265,482.

This invention relates to apparatus for depositing mats or other bodies of multi-filament strands upon a receiving surface such as a conveyor. The invention pertains particularly to mats of fibrous glass strands.

Mats of fibrous glass because of the inherent properties of glass, especially those of strength and inertness, have many uses. They have been employed as filtering, acoustical and thermal insulating media. They also serve effectively for roofing sheets, non-woven fabrics, and for reinforcing plastic products.

In some instances the mats are composed of short fibers held together by a binder. In others the mats are bonded webs of chopped fibrous glass strands. Bundles or strands of continuous glass filaments have also been disposed in mat form. Strands of filaments have superior strength because of the continuous nature of the filaments and their concentrated linear association in strand form. Accordingly, fibrous glass strands are a most desirable mat constituent where strength is a prime consideration.

However, there have been difficulties involved in the fabrication of strand mats as well as deficiencies in such mat products. Because of the comparative greater bulk of the standard fibrous glass strands, they are not inclined to become easily entangled to form an integrated mass. They also are not disposed to lie in a flat formation. A further objection has been that the production of such mats has been costly due to requirements of special equipment and slow and involved processing.

Also, in mats of conventional strands there is a lack of integrity, insufficient porosity, and a coarse appearance.

Some of these deficiencies have been overcome by partial filamentizing of the strands by impinging them against a deflecting surface before the strands are massed in mat form. The resulting fuzziness promotes interengagement of the strands or semi-felting action which tends to integrate the mat product.

Of greater benefit in the creation of such mats has been apparatus developed for directing a plurality of strands in a reciprocating band across a conveyor. The strands are thus deposited in overlapping strips to form a mat of uniform thickness or weight.

While such apparatus has functioned successfully, there have been difficulties in its operation which have caused interruptions and irregularities in function. For instance, undue time has been required in the gathering of filaments into a plurality of strands in preparing the apparatus for operation. Also, there has been an objectionable adhesion of the strands to side shields of the conveyor and to the surface of the pull wheel.

In general, then, it is an object of this invention to provide apparatus for more expeditiously and economically producing mats of fibrous glass strands.

Another object is to provide apparatus with means for more effectively dispersing or filamentizing strands as they are deposited in mat form.

A more specific object of this invention is to provide apparatus for drawing continuous filaments of glass, gathering the filaments into a plurality of strands, projecting the plurality of strands in parallel and planar formation back and forth across a conveyor and intercepting the strands with filamentizing means before the strands are deposited in mat form on the conveyor.

These and other objects and advantages are secured through the apparatus disclosed herein incorporating a pull wheel for drawing glass filaments and grooved guide shoes for gathering them into a plurality of strands of a size below that of conventional strands, the strands being directed in closely aligned, parallel formation back and forth across a traveling conveyor, and collected as an integrated mat upon the conveyor.

The objects of the invention are more particularly promoted through the cylindrical screen means for deflecting and filamentizing the projected strands and mechanism for expediting the initial operation of the apparatus by facilitating the division of the filaments into groups and gathering the groups into strands.

The objects are further attained through means for spraying a lubricant on the pull wheel and for maintaining water films on the side shields of the conveyor.

In the drawings, FIGURE 1 is a front elevation of apparatus embodying the invention;

FIGURE 5 is a front view with a section broken away of an idler wheel comprising a part of the apparatus of this invention;

FIGURE 6 is a partial vertical section and a partial side elevational view of the idler wheel of FIGURE 5;

FIGURE 7 depicts a typical pattern which a strand may follow when deposited by the apparatus of this invention;

FIGURE 8 is a front elevation of a pull wheel with a strand filamentizing element and a strand threading and guiding means associated therewith and also constituting an important feature of this invention; and FIGURE 9 is a side elevational view of the structure of FIGURE 8.

Figure 1:
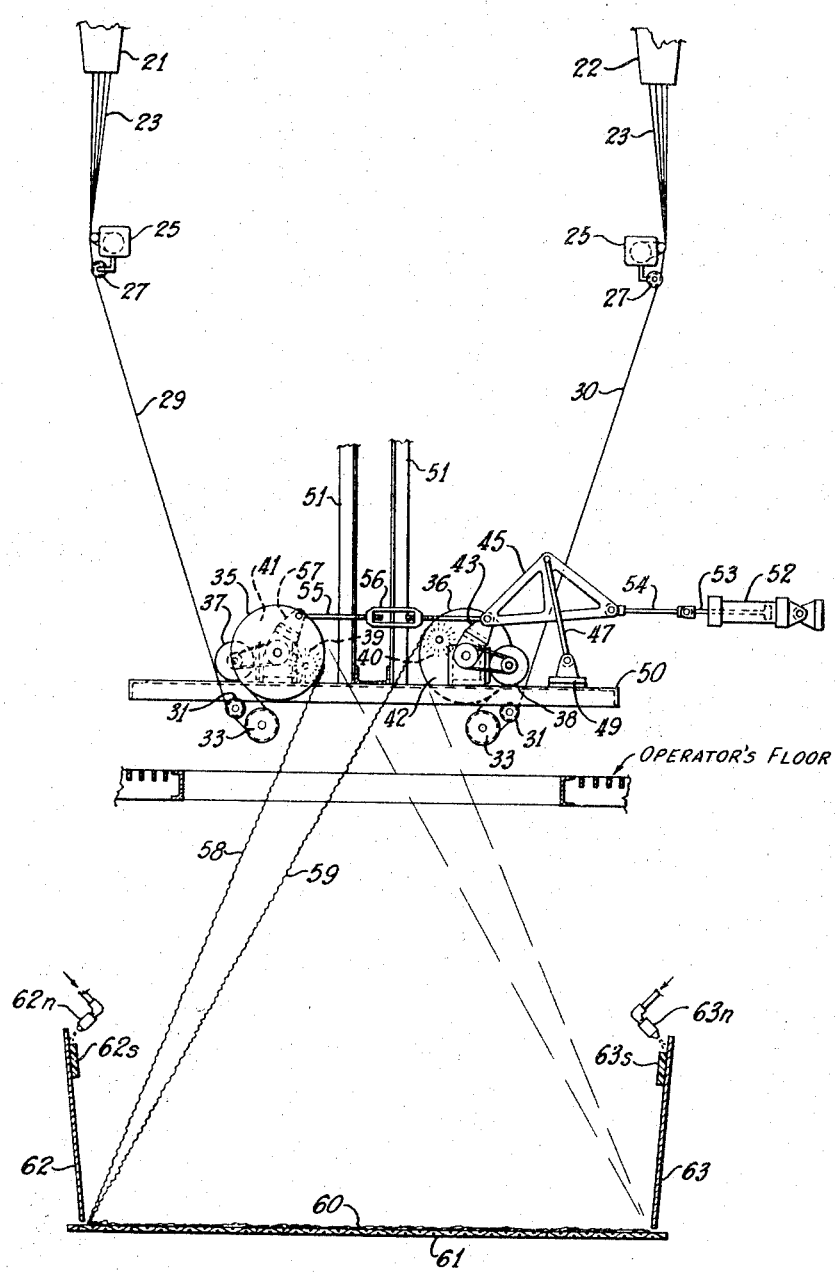
Figure 2:
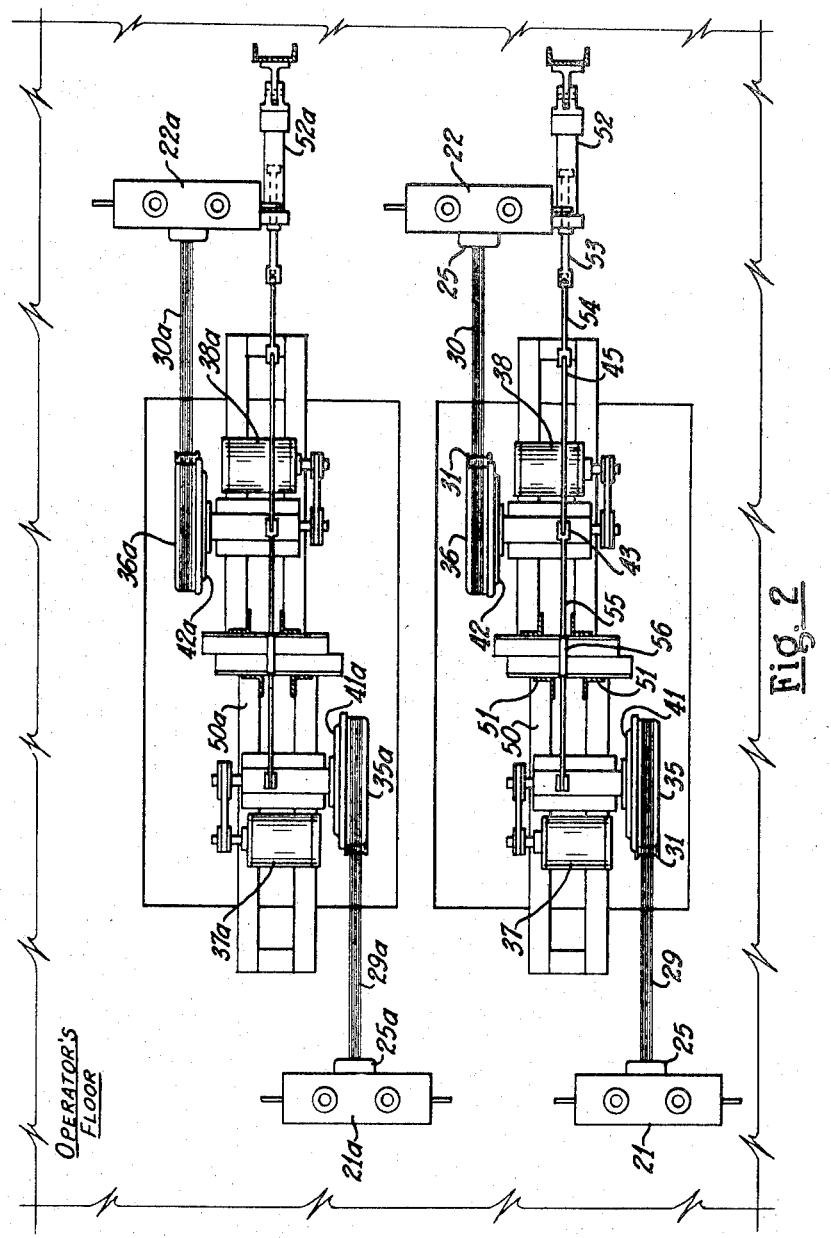
FIGURE 2 is an enlarged plan view of the apparatus of FIGURE 1, with an additional pair of pull wheels and associated equipment.

Referring to the drawings in more detail the apparatus of FIGURES 1 and 2 includes molten glass feeding bushings 21 and 22 depending from conventional glass melting tanks which are not illustrated. A second paired set of bushings 21a and 22a is depicted in FIGURE 2. The additional equipment of FIGURE 2 duplicates that of FIGURE 1 and will not be described separately. The main components carry the same identifying numbers as the like parts of the apparatus of FIGURE 1 but with the letter a following each number.

Continuous filaments 23 are drawn from the minute streams of molten glass issuing from orifices of the bushings. It will be considered that a bushing with 352 orifices is here utilized and the filaments are drawn to an average diameter of fifty, hundred thousandths of an inch.

Size is applied to the filaments as the latter pass over the traveling belts or aprons of the conventional size applicators 25. The size may merely be water to reduce friction between filaments as they are subsequently joined together in strand form. A more complex size or binder is however desired to promote coherence of the filaments when combined as strands, and adherence of the strands of filaments to the surfaces of the pulling wheels. Where the mat produced is to be ultimately combined with a plastic resin, it is also desirable to include a coupling agent in the size which facilitates wetting of the mat by the resin.

A preferred form of binder is one retaining sufficient cohesive properties when cured to contribute to the bonding of the strands in the mat or other form in which they are collected on the conveyor or the receiving surface. Such a binder has the dual purpose of holding the filaments together as strands, and bonding the strands into an integrated body. This primary liquid binder is advantageously utilized in combination with a powdered binder subsequently dispersed through the mat.

As the mats are produced immediately below the glass filament forming stations, a commonly used lubricant component of the size may be omitted. The inclusion of such a lubricating material has been found necessary for improving the handleability of the strands where the strands go through subsequent operations such as plying and twisting, but it is not otherwise necessary and in fact interferes with effective wetting of the strands by a plastic resin.

The filaments from each bushing, after sizing, are grouped together to form a set of six strands individually segregated as they travel within six grooves over the respective gathering shoe 27. Each strand contains about sixty filaments. The division of the filaments into strands is here accomplished manually at the start of operations.

The sets of strands 29 and 30 pass under the aligning shoes 31 which are grooved in the same manner as the gathering shoes 27.

To help keep the pull wheels clean of size and to distribute the wearing action of the strands on the pull wheel the aligning shoes may be given a slight traversing action. This slowly shifts the strand position on the pulling wheel, moving back and forth about once in three minutes.

From shoes 31 the two sets of spaced strands 29 and 30 are led around the two idler wheels 33 and respectively travel around the pull wheels 35 and 36. These wheels are similarly constructed but are relatively reversed in position and are on opposite sides of the center line of the receiving conveyor 61.

Motors 37 and 38 respectively drive pull wheels 35 and 36. The strands carried by pull wheel 35 are released therefrom by the successive projection of fingers of oscillating spoke wheel 39 through slots in the peripheral surface of the pull wheel 35, while the fingers of spoke wheel 40 serve this purpose in connection with pull wheel 36. The strands are kinetically projected in tangential paths from the pull wheels.

The rear side of each pull wheel is covered by an independently mounted, oscillatable back plate on which the associated spoke wheel is carried. Back plate 42 of the assembly including pull wheel 36 is arcuately oscillated through arm 43. The latter is driven by functioning of fluid cylinder 52 which sets through the triangular link 45, which pivots upon bar 47 on the base 49. The piston rod 53 extending from the cylinder is joined to the triangular link 45 by linking rod 54. The base 49 is positioned on the platform 50 which also supports the pull wheels 35 and 36 and the equipment associated therewith. Platform 50 is suspended by angle iron hangers 51.

Through the connecting assembly 55, including the turnbuckle 56, the transverse movement of the triangular link 45 is transmitted to arm 57 to arcuately oscillate the spoke wheel 39 within the pull wheel 35. This oscillation is preferably in an arc of approximately fifty seven degrees. With the single means effecting the oscillation of both spoke wheels their action may be closely synchronized.

The group of strands 58 thrown down by the pull wheel 35 and the group of stands 59 thrown down by the pull wheel 36, and the strands from any other pull wheels preceding this pair are accumulated in mat form 60 upon traveling conveyor 61, which is preferably of carbon steel chain construction. Side shields 62 and 63 define the edges of the mat 60 and prevent undesirable lateral overreaching of the strands. A two foot height for these shields is generally sufficient.

To prevent adherence of the strands to the side shields 62 and 63, strips 61s and 63s of open-cell foam or other porous material, such as plain cotton rags, about one half inch thick are attached along the shields near the top edges thereof. Water nozzles 62n and 63n are arranged to feed water to the upper surface of the porous strips. The water seeps through and is distributed uniformly to form a water film flowing down the surfaces of the shields. Tubing with a series of holes may be used instead of the nozzles 62n and 63n to deliver the water and may, if properly ported, be employed for directly forming the water films.

The width of the conveyor covered by the mat in this case is four and one half feet, but this may be varied through a wide range by changing the oscillating arc length of the spoke wheels and the distance of the pull wheels above the conveyor. The side shields 62 and 63 are mounted to adjust their spacing to match the width of the deposited material. Ordinarily the width utilized would be between extreme limits of two and nine feet.

Figure 3:
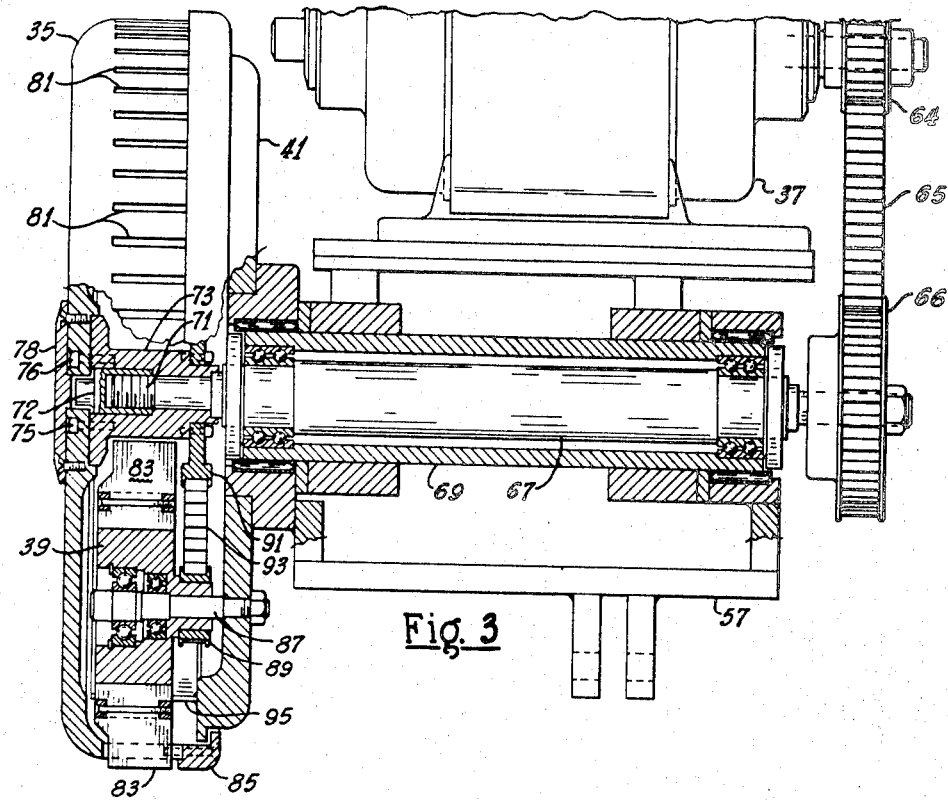
FIGURE 3 is a side elevation with portions in section of one of the pull wheels and the motor drive therefor incorporated in the apparatus of FIGURES 1 and 2.
Figure 4:
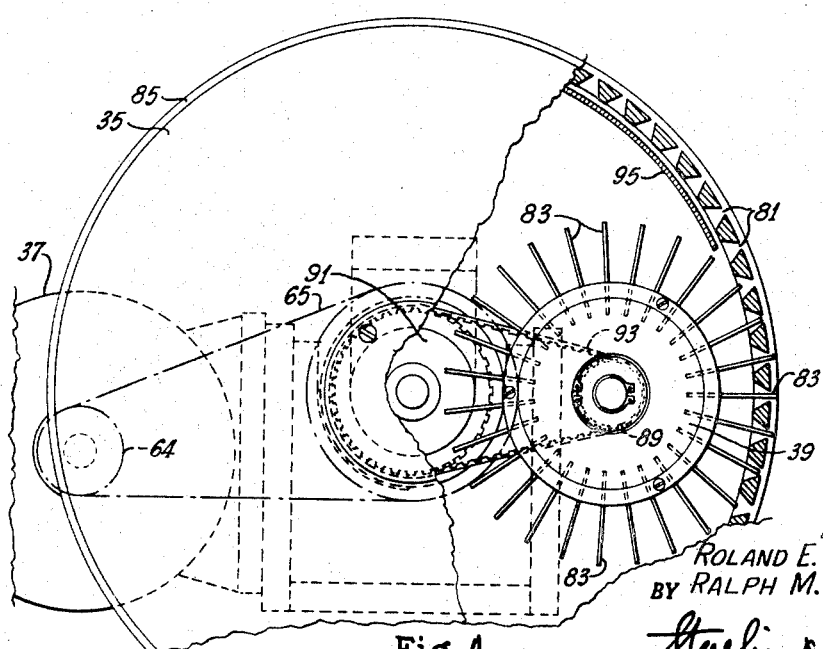
FIGURE 4 is a fragmentary front view with parts broken away of the pull wheel and motor drive of FIGURE 3 with the assembly turned ninety degrees counterclockwise from the position of FIGURE 3.

The pull wheel 35 and the drive therefor are shown in more detail in FIGURES 3 and 4. On the shaft of motor 37 is a toothed pulley 64 which has driving connection through the segmented timing belt 65 with toothed pulley 66. The latter is mounted on the outer end of shaft 67, on the other end of which is carried the pull wheel 35.

The shaft 67 is journaled in the stationary casing 69 upon which the motor 37 is supported. The pull wheel is held upon the threaded stud 71 of the shaft 67 by the barrel nut 72. The hub 73 of the pull wheel has a bored section fitting over the smooth portion of the stud 71 and held against a shoulder terminating the smooth portion by the barrel nut 72. The main body of the pull wheel is fastened to the hub 73 by machine screws 75 and 76. A cap 78 covers the outer end of the bore through the hub.

In a preferred embodiment the pull wheel 35 is twelve inches in diameter and has a series of peripheral cross slots 81, approximately one and one eighth inches long, three sixteenths of an inch wide and spaced five sixteenths of an inch apart. To reduce the wear, the strand receiving surface of the pull wheel is given a hard surface such as an electrolytic deposit of aluminum oxide or a coating of nickel phosphate.

The fingers 83 of the spoke wheel 39 within the pull wheel 35 are dimensioned and motivated to successively project through the slots 81. The spoke wheel is mounted on shaft 87 projecting from the back plate 41 and carries the toothed pulley 89 on a rearward extension of the wheel hub 73.

The main body of the spoke wheel 39 is in this instance about three and three quarter inches in diameter with the fingers 83, twenty-seven in number, radially extending slightly more than thirteen sixteenths of an inch from the periphery of the main body. The exterior portions of the fingers are generally of rectangular blade form one inch wide with a thickness of .024 of an inch. About one eighth of an inch of the outer end of the fingers extend out of the pull wheel slots at the point of their greatest projection.

The movement of the fingers 83 into the slots 81 and their momentary projection through the slots to release the strands is synchronized through the timing drive between the pull wheel and the spoke wheel. This includes the toothed pulley 91 fixed upon the hub 73 of the pull wheel, the cog timing belt 93 running over pulley 91, and the pulley 89 on the shaft 87 upon which the spoke wheel is journaled.

The back plate 41, oscillatable through yoke 57 to which it is attached, is mounted through bearings on the stationary casing 69. Yoke 57 and therethrough back plate 41 and the spoke wheel 39 are oscillated in an arc of approximately 57° by functioning of fluid cylinder 51.

Air movement into the interior of the pull wheel 35 is curtailed by the shroud ring 85 held to the inner edge of the wheel periphery by a series of machine screws. A baffle 95 interruptedly cylindrical in form, is carried by the oscillating back plate 41 and lies under the slots 81 except for an open section of the baffle in the region of the spoke wheel. This prevents air movement outwardly through the slots which is apt to irregularly release strands from the pull wheel. As the baffle oscillates with the spoke wheel, the open portion of the baffle is always in the area where the fingers 83 enter the slots 81 of the pull wheel.

With the high peripheral speed of the pull wheel, the strands are forcefully projected in straight tangential lines from the oscillating point of disengagement effected by the fingers of the spoke wheel. The kinetic energy the strands thus acquire carries them in straight courses to the region of the conveyor surface. Here they are self-positioning in lazy whirl formation with each strand assuming an individualistic pattern but disposed in interengagng and interleaving relation with the other five strands of the set.

A typical pattern of a single deposited strand 60a is depicted in FIGURE 11. The smooth easy curve 60b appears repeatedly in overlying loops and coils.

Under a stroboscope it has been observed that the strands leaving the pull wheel vibrate or pulsate at a uniform high frequency. This is believed a factor in the natural, smooth character of the looping deposit of the strands on the conveyor.

The six strands of each set led over a pull wheel, as previously stated, are composed of an average of sixty filaments with each filament having a nominal diameter of fifty, hundred thousandths of an inch. The individual strands are roughly six thousandths of an inch in diameter and are delivered to the surface of the pull wheel closely arrayed in parallel relation and in a planar band. The strands may be uniformly spaced apart about one eighth of an inch. A strip of the peripheral surface of the pulling wheel no more than one half of an inch wide is then occupied by the set of six strands.

If a greater number of strands are included in a set drawn over the pull wheel they are positioned more closely together. While probably twelve strands is about the maximum practical number, as many as thirty may be thrown down from a single wheel of the particular embodiment herein described. These could be spaced only one thirty second of an inch apart. The number and spacing of the grooves on the stationary gathering shoes 27, and on the guiding shoes 31 are arranged to space and guide the particular number of strands utilized.

The traction between the strands and the surface of the pull wheel is ample to furnish the pulling force that attenuates the glass filaments formed from the minute molten glass streams issuing from the orifices of the furnace bushing. This adherence of the strands to the pull wheel is evidently due to the cohesive effect of the size carried by the strands and other not clearly understood air and surface forces of attraction.

The pull wheel is driven at a speed of about two thousand revolutions per minute to deliver the strands at a rate of six thousand feet per minute. This rate may feasibly range from two to twelve thousand feet per minute.

The fluid cylinder 53 is actuated sixty times a minute to cause the spoke wheels to oscillate at the same rate and to thus direct the strands released from the pull wheels back and forth across the conveyor sixty times per minute. Because of the high rate of deposit, even with sixty reciprocations of the strands across the conveyor per minute, ten inches of strand is delivered to the conveyor for every inch of the strand travel across the conveyor. This explains why the strand must repeatedly loop upon itself and upon the strands with which it is associated as it reaches the surface of the conveyor. Higher rates of reciprocation are feasible but if raised substantially should be coupled with higher feeding rates. Otherwise there is a decrease in the looping of the strands and less coherence of the deposited strips.

With a conveyor speed of seven feet per minute there will be one hundred and twenty overlapped cross strips of strand for every seven foot length of the deposited mat, with an average overlap of about two thirds of an inch between the composite strips laid down from each pull wheel. A succession of twelve pull wheels arranged in six pairs and handling strands assembled from filaments from twelve bushings is considered a desirable production system. This number is, of course, variable to meet any production requirements that may arise, and for lighter mats all of the pull wheels need not be utilized.

In FIGURES 5 and 6 is shown the detailed construction of idler wheel 33. In the same manner as a size carrying strand adheres to the metal surface of the pull wheel 35 or 36, will such a strand attach itself to the metal surface of an idler wheel around which it may be led. Where a single strand is involved there is little objection to such adherence. However, when a plurality of strands travel together around an idler wheel, the strand under the most tension grips the wheel firmly and controls its speed of rotation. At least some of the other strands then develop a slack or looseness that is amplified in time to a point where there occurs a misalignment or other sloppiness in the desired path traveled by these strands. An equalization is accordingly needed in the driving contact of the strands with the idler wheel.

To accomplish this purpose an idler pulley has been designed with cross contact lands spaced around the periphery of the wheel. If these lands are of sufficiently small area and spaced well apart the traction between the strand under the greatest tension and the wheel surface will be below that required to drive the wheel. Slippage between the strand and the wheel then develops to the slight degree that allows several of the other strands to adhere to the wheel so that they jointly drive the wheel. Such an idler wheel thus acts to equalize the tension of the strands and to deliver them in a uniform manner to the pull wheel.

As the strands adhere less readliy to a graphite surface than to one of metal, the preferred form of idler wheel includes lands of such material. As shown in FIGURES 5 and 6, the wheel 33 has a main body 114. A pair of flanges 115 project from the edges of the rim of the main body. Through ball bearing cages the body is rotatably mounted on the stationary shaft 116.

There are transverse grooves 117 in the periphery of the body 114. These grooves terminate at one side in blind bores in one of the flanges 115 and in open bores in the other of the flanges 115. Positioned in the grooves 117 and projecting into the end bores are cylindrical graphite inserts 118 about one quarter of an inch in diameter. A preferred graphite composition includes twenty percent molybdenum. The inserts are locked in position by the retainer plate 119 fastened to the body by machine screws 120.

About one third of the circumferential area of the inserts is above the cylindrical surface of the main body. The strands driving the idler wheel accordingly have only point contact therewith as the strands span the spacings between the inserts and touch the inserts in a tangential manner.

In FIGURES 8 and 9 is illustrated a modified embodiment of a pull wheel and strand delivery means incorporting the main features of this invention.

The continuous filaments 23 are here depicted as they reach the size applicator 25 after their drawing and attenuation from the bushing orifices. The size applicator includes a container 121 to which the sizing liquid is delivered by inlet 122. The level of the liquid within the container is maintained by the overflow outlet 123. A belt traveling through the liquid within the container carries the size around roller 125 where the filaments pass over the belt to pick up the size.

The filaments 23 are gathered into six strands with each strand fitting within a groove of the gathering shoe 126. This grouping of the filaments into strands may be a hand operation that follows an initial pulling of all the filaments combined in a single strand over a temporarily utilized, single groove shoe.

The filaments, as they are drawn down from an orificed forming bushing over a single groove shoe, are disposed in a fan configuration converging at the shoe. The running filaments may be loosely grasped in successive portions and manually brought together for placing in successive grooves of the gathering shoe 126.

Or the gathering shoe 126 may be pivotally mounted adjacently above the temporary single groove shoe so that it may be swung against the fan of filaments where the width of the fan is equal to the span of grooves on the shoe. The peaks between the grooves then serve to divide the filaments into groups and to collect each group in a groove of the shoe. The gathering shoe is then fixed in position. The temporary shoe may then be moved out of engagement with the filaments in case the filaments have not been dislodged therefrom by the pivoting of shoe 126 against the filaments.

The division of the starting single strand must be carried down from the gathering shoe 126 to the aligning shoe 127 which delivers the spaced strands to the idler wheel 131 and thence to the pull wheel 132. This placing of the separated strands upon the aligning shoe 127 is accomplished with the apparatus here disclosed by having the shoe 127 mounted on a holder 128 which is vertically slidable on the flat bar 130. The bar 130 is mounted to pivot at its lower end and is swung to the left as indicated by the arrow from the position shown in full lines in FIGURE 12. The shoe 127 is then pushed up to the bar to the upper position indicated in dotted lines where it is held by the spring arm 129.

The aligning shoe 127 is thus placed back of the strands 136 as they convergingly extend down from the grooves of the gathering shoe 126. The bar 130 is then swung to the right or forwardly to the position shown in FIGURE 12 so that the separate strands enter the grooves of the aligning shoe 127 in matching array to their spacing upon the gathering shoe. The aligning shoe 127 is then slid downwardly upon the bar 130 while constantly pressing against the strands and thus holding them in the grooves. The strands are thus brought down in proper divided form as the aligning shoe reaches its regular position at the lower end of the bar adjacent the idler wheel 131.

The gathering and aligning shoes are preferably of wheel form, as illustrated, because this shape is easy to manufacture, provides excess groove area to present new unworn surfaces when required, and avoids sharp lead and departure edges. Many other structural shapes upon which curved grooves could be machined or molded would function quite satisfactorily.

The pull wheel 132 has a special strand deflecting and dispersing device 133 held by the bracket 134 to the oscillating back plate 135 of the pull wheel. The deflector is thus reciprocated synchronously with the spoke wheel and maintained in the path of the strands.

This deflecting device is of cylindrical form and composed of metal screening. It has been found that strands are inclined to stick to the smooth, continuous surfaces of deflecting devices previously utilized to disperse or fiberize strands projected thereagainst. This is apparently due to the wetting of their impervious surfaces by the sizing liquid. The air that moves along with strands projected from a pulling wheel passes through the screen surface of the subject deflector to an extent sufficient to carry away any size tending to collect thereon. This through passage for the air has also been found beneficial as it lessens the turbulence of air occurring at the surface of a deflector and which ordinarily effects an undesirable irregularity in the path of the strands from the deflector.

The round wires of the screen present a minimum surface to strands striking there-against and also include no sharp edges on which the strands could catch. The screen is superior to a perforated sheet in this respect as well as providing more open area than such a deflector. The curved shape of the screen serves to spread slightly the deflected fiberized strands.

In some circumstances it is considered very advantageous to have a layer of fiberized strands, such as produced by the screen deflector 133, on the top and bottom of a mat otherwise composed of the easily resin-impregnated, integrated strands of a comparatively small number of filaments, for the production of which the apparatus of this invention is primarily intended.

A flattened layer of filamentized strands provides a smoother, more closely grained and less patterned surface than that presented by a layer of the integrated strands. This is particularly desirable when the reinforcing mat is observable through a transparent plastic or when the finish of the molded product reflects the surface characteristics of the embedded mat.

To obtain a mat with this type of surfacing, as previously described, the first and last pull wheels of a series longitudinally spaced over the mat production conveyor would have fiberizing deflection devices intercepting the strands projected from these particular pull wheels.

For some purposes a mat with all strand components filamentized is particularly suitable. In such circumstances all of the pull wheels are equipped with the deflection devices.

With the amount of binder usually prescribed by this invention there is an accumulation built up by partial drying of the binder on the pull wheel. This becomes sticky and causes strands to overrun their normal point of projection, thus disrupting the process. This accumulation and drying are prevented by directing a light mist of water on the pull wheel. A spray nozzle 146 for this purpose is illustrated in FIGURE 8. Water supply piping 148 supports the nozzle. About half a gallon of water per hour is adequate for this purpose. As shown, the water is applied to the surface of the pull wheel where it is free of the strands.

Undesirable adherence of the binder loaded strands during the guiding and projection thereof is further avoided by the restriction of contact of the elements of the apparatus with the strands to one side only of the strands.

The features of the invention which contribute to its success and effectiveness include the cylindrical deflector screen for fiberizing the strands; the arrangement for threading the gathering shoe and then threading the aligning shoe by temporarily bringing it up adjacent to the gathering shoe; the means to form a film of water on the conveyor side shields; and the water spray on the pull wheel to prevent size accumulation.

All of these features have importance in the attainment of the objects of the invention.

Possible modifications and substitutions for elements of the apparatus of this invention will easily occur to those skilled in the art, and any such obvious changes are considered within the spirit of the invention and the scope of the accompanying claims.

We claim:

1. Apparatus for delivering a fiberized strand for a collecting surface comprising a rotating pull wheel for receiving a strand in periphery following adherence, means for releasing the strand from the pull wheel whereby the strand is kinetically projected therefrom in a tangential path, a collecting surface positioned to receive the strand, and a strand fiberizing and deflecting element between the pull wheel and the receiving surface, said element having a perforated surface on the side thereof facing toward the pull wheel, said perforated surface being positioned at an angle to the longitudinal axis of the tangential path of the strand and in intercepting relation to said path.

2. Apparatus according to claim 1 in which the perforated surface of the fiberizing and deflecting element is composed of open mesh screening.

3. Apparatus for producing mat products incorporating material in continuous strand form comprising means for imparting high velocity motion to a continuous strand, and means providing a deflecting surface on the side of the means facing toward the means for imparting high velocity motion, said deflecting surface being positioned transversely of the path of said strand, the motion imparted to said strand having sufficient velocity to cause deflection of the strand from the deflecting surface after its impingement thereagainst, said deflecting surface being generally rough in character with numerous small projecting elements thereon.

4. Apparatus according to claim 3 in which the projecting elements are reticular.

5. Apparatus according to claim 3 in which there are small openings between the projecting elements.

6. Apparatus according to claim 3 in which the deflecting surface is open mesh screening.

7. Apparatus according to claim 3 in which the deflecting surface is upwardly curved in cross section with the axis of curvature angled to the longitudinal axis of the path of the strand.

References Cited

UNITED STATES PATENTS

| | | | |
|---|---|---|---|
| 2,586,774 | 2/1952 | Bastian et al. | 65—114 X |
| 3,071,301 | 1/1963 | Benson et al. | 65—114 X |
| 3,236,616 | 2/1966 | Stalego et al. | 65—9 X |

DONALL H. SYLVESTER, *Primary Examiner.*

R. L. LINDSAY, *Assistant Examiner.*